US012116952B1

(12) United States Patent
Tichy et al.

(10) Patent No.: US 12,116,952 B1
(45) Date of Patent: Oct. 15, 2024

(54) INTERNAL COMBUSTION ENGINE AND COMBUSTION CHAMBER FOR AN INTERNAL COMBUSTION ENGINE

(71) Applicants: Hyundai Motor Company, Seoul (KR); Kia Corporation, Seoul (KR)

(72) Inventors: Milos Tichy, Griesheim (DE); Daniel Riedl, Mannheim (DE); André Schwab, Mainz (DE); Paul Fungai Kachisi, Frankfurt am Main (DE); Thorsten Rau, Hünfelden (DE); Dominik Adam, Darmstadt (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/506,469

(22) Filed: Nov. 10, 2023

(30) Foreign Application Priority Data

Jul. 5, 2023 (DE) .......................... 102023117748.6

(51) Int. Cl.
*F02F 1/24* (2006.01)
*F02F 1/42* (2006.01)

(52) U.S. Cl.
CPC ............ *F02F 1/242* (2013.01); *F02F 1/4285* (2013.01)

(58) Field of Classification Search
CPC .. F02F 1/242; F02F 1/4285; F02F 1/18; F02F 2001/241; F02M 21/04; F02M 57/00; F02M 61/16; F02M 61/162
See application file for complete search history.

(56) References Cited

U.S. PATENT DOCUMENTS

| | | | | |
|---|---|---|---|---|
| 5,605,125 A | * | 2/1997 | Yaoita | F02F 1/4221 123/298 |
| 5,613,471 A | * | 3/1997 | Yaoita | F02B 19/14 123/298 |
| 6,098,589 A | * | 8/2000 | Klenk | F02B 23/101 123/298 |
| 6,170,457 B1 | * | 1/2001 | Grajkowski | F02F 1/242 123/298 |
| 6,378,488 B1 | * | 4/2002 | Trigui | F02B 23/101 123/193.5 |

(Continued)

FOREIGN PATENT DOCUMENTS

DE            19955544 A1 * 5/2001 ................ F02F 1/38

*Primary Examiner* — Grant Moubry
(74) *Attorney, Agent, or Firm* — SLATER MATSIL, LLP (57) ABSTRACT

An embodiment combustion chamber for an internal combustion engine includes a chamber body including a cylinder configured to receive fuel and air for carrying out an engine cycle including a combustion reaction of the fuel and a chamber roof including an injector tunnel opening disposed on an inner surface of the chamber roof, the injector tunnel opening being configured to guide the fuel injected in an injecting direction toward the cylinder, and the injector tunnel opening including a protrusion disposed on a path of the fuel along the injecting direction, the protrusion being configured to re-direct the path of the fuel along a re-directed path away from the inner surface of the chamber roof and a pair of grooves arranged on sides of the protrusion, respectively, the pair of grooves being configured to guide the fuel separated by the protrusion to the sides of the protrusion.

18 Claims, 10 Drawing Sheets

(56) References Cited

U.S. PATENT DOCUMENTS

| | | | | |
|---|---|---|---|---|
| 7,273,031 B1* | 9/2007 | Huebler | ................ | F02B 23/101 |
| | | | | 123/298 |
| 2023/0112941 A1* | 4/2023 | Yarino | .................... | F02F 1/242 |
| | | | | 123/193.5 |

* cited by examiner

INTERNAL COMBUSTION ENGINE AND COMBUSTION CHAMBER FOR AN INTERNAL COMBUSTION ENGINE

CROSS-REFERENCE TO RELATED APPLICATIONS

This application claims the benefit of German Patent Application No. 102023117748.6, filed on Jul. 5, 2023, which application is hereby incorporated herein by reference.

TECHNICAL FIELD

The present invention pertains to a combustion chamber for an internal combustion engine of a vehicle.

BACKGROUND

Future generations of internal combustion engines (ICE) are likely to use hydrogen instead of fossil fuels for the combustion to become CO2 neutral. The alternative fuel like hydrogen could be a crucial measure to achieve zero CO2 emission for the combustion engine.

The internal combustion engines include a piston mounted in a linearly sliding manner along a longitudinal axis of a cylinder and a spark plug configured to ignite a fuel mixture that consists of fuel and air. When the spark plug is controlled to activate, the fuel mixture is ignited inside the combustion chamber and the piston is pushed down along the longitudinal axis of the cylinder due to the increasing pressure caused by the combustion reaction.

In case of a gaseous fuel, such as hydrogen, it is crucial to control overall flows of the fuel mixture because both the gaseous fuel and the air are highly impacted by airflows.

If the fuel mixture is not sufficiently and homogeneously distributed within the combustion chamber, it will cause NOx emissions at areas with a high concentration of the gaseous fuel and unburned fuel at areas with a low concentration of the gaseous fuel.

SUMMARY

Hence, there is a need to find solutions for improving mixture formation/homogeneity of fuel and air.

To this end, embodiments of the present invention provide a combustion chamber for an internal combustion engine and the internal combustion engine.

According to one embodiment of the invention, a combustion chamber for an internal combustion engine includes a chamber body including a cylinder configured to receive fuel and air for carrying out an engine cycle including a combustion due to a chemical reaction of fuel and air and a chamber roof including an injector tunnel opening disposed on an inner surface of the chamber roof being configured to guide the fuel injected in an injecting direction toward the cylinder. The injector tunnel opening includes a protrusion disposed on a path of the fuel along the injector direction along an injector axis in case of lateral injector position to re-direct the path of the fuel away from the inner surface of the chamber roof and a pair of grooves arranged on both sides of the protrusion to guide the fuel separated by the protrusion to both sides next to the protrusion acting as a side distribution effect.

According to a second embodiment of the invention, an internal combustion engine includes at least one inlet valve positioned on a respective inlet port of the combustion chamber to control the air flowing into the cylinder, at least one outlet valve positioned on a respective outlet port of the combustion chamber to control the exhaust gas flowing out from the cylinder, a spark plug mounted on the chamber roof and configured to periodically ignite a mixture of the fuel and the air filled in the cylinder, a piston mounted in a sliding manner along a longitudinal axis of the cylinder so as to travel along the longitudinal axis according to the combustion reaction, and an injector in the lateral position disposed to inject the fuel in the injecting direction into the cylinder.

According to an embodiment, the protrusion may have a protruding edged-boundary between the injector tunnel opening and the inner surface of the chamber roof.

According to an embodiment, the protruding edged-boundary may extend from a center of the protrusion toward both sides of the protrusion and connect with the pair of grooves.

According to an embodiment, a center of the protrusion may protrude toward a center of the cylinder more than both sides of the protrusion.

According to an embodiment, the re-directed path of the fuel may include a curved path along a surface of the injector tunnel opening toward a protruding edged-boundary of the protrusion.

According to an embodiment, the injector tunnel opening may be disposed between the chamber body and the chamber roof.

According to an embodiment, the protrusion may be disposed on one side of the injector tunnel opening that is distant from the chamber body.

According to an embodiment, the chamber roof may further include at least one inlet port configured to feed the cylinder with the air and at least one outlet port configured to remove exhaust gas from the cylinder formed during and after the combustion reaction. Each of the pair of grooves may be disposed to connect the injector tunnel opening with at least one inlet port.

According to an embodiment, the chamber roof may be a dome-shape.

According to embodiments of the present invention, mixture formation of gaseous fuel can be improved by sufficiently distributing the gaseous fuel throughout the combustion chamber using an optimized injector tunnel shape.

Embodiments of the invention will be explained in greater detail with reference to exemplary embodiments depicted in the drawings as appended.

BRIEF DESCRIPTION OF THE DRAWINGS

The accompanying drawings are included to provide a further understanding of embodiments of the present invention and are incorporated in and constitute a part of this specification. The drawings illustrate exemplary embodiments of the present invention and together with the description serve to explain the principles of embodiments of the invention. Other embodiments of the present invention and many of the intended advantages of embodiments of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF ILLUSTRATIVE EMBODIMENTS

Figure 1:
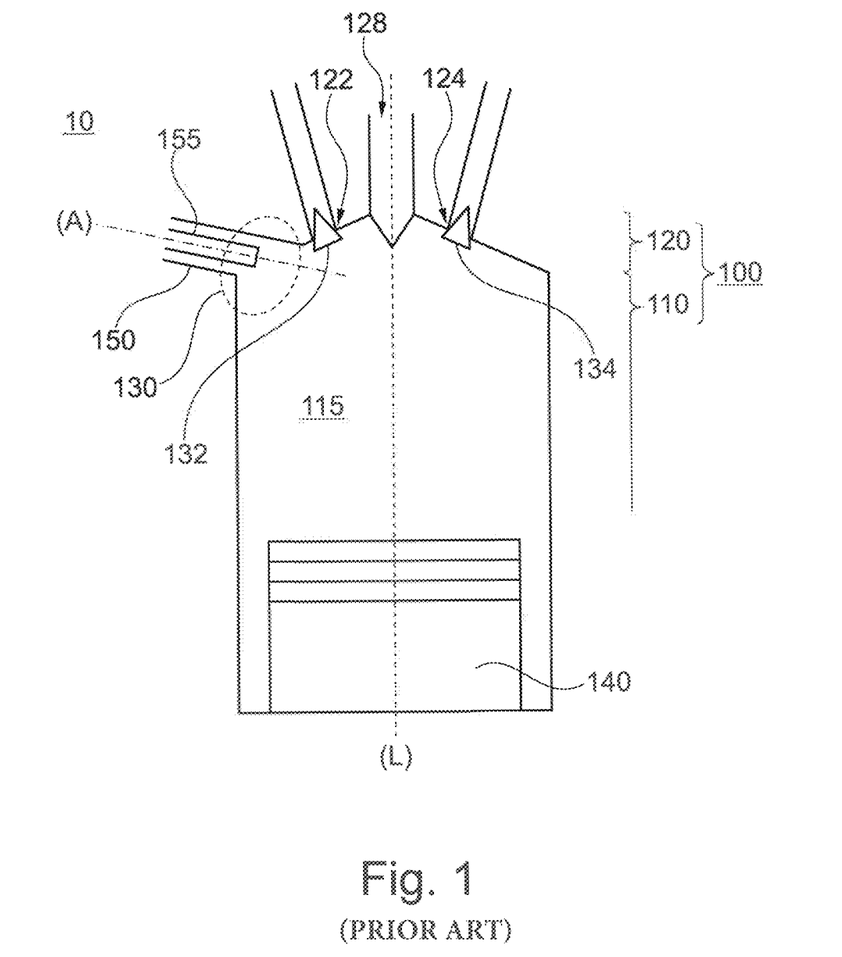
FIG. 1 is an example of schematic diagram of a combustion chamber for an internal combustion engine according to the prior art.

FIG. 1 is an example of schematic diagram of a combustion chamber for an internal combustion engine according to the prior art.

As shown in FIG. 1, the combustion chamber 100 for an internal combustion engine includes a chamber body 110 and a chamber roof 120.

The chamber body 110 may include a cylinder 115. The cylinder 115 may be configured to receive fuel and air for carrying out an engine cycle including a combustion reaction of the fuel. The cylinder 115 may have a longitudinal axis (L) along which a piston 140 moves. In response to the combustion reaction, the piston moves down along the longitudinal axis (L) of the cylinder 115.

The chamber roof 120 may include at least one inlet port 122 configured to feed the cylinder 115 with the air and at least one outlet port 124 configured to remove exhaust gas from the cylinder formed during and after the combustion reaction. The at least one inlet port 122 may be configured such that the inlet port 122 can comprise a respective inlet valve 132. The at least one outlet port 124 may be configured such that the outlet port 124 can comprise a respective outlet valve 134.

The chamber roof 120 may be configured to accommodate a spark plug 128 intersecting an inner surface of the chamber roof 120. The spark plug 128 may be mounted in a drilling above the chamber roof 120 and may be configured to periodically ignite the fuel mixture including the fuel and the air filled in the cylinder 115.

The chamber roof 120 may include an injector tunnel 150 where the fuel is injected through. Inside the injector tunnel 150, an injector 155 may be positioned. As shown in FIG. 1, the fuel may be injected in an injecting direction (A). The intersection area of the injector tunnel 150 and an inner surface of the chamber roof 120 may be referred to as an injector tunnel opening 130. The injector tunnel opening 130 shown in FIG. 1 may have a shape generated by free form surfaces, such as a circle, a triangle, an oval, a funnel, etc.

According to the prior art, a fraction of the gaseous fuel is drawn and attached to a part of the inner surface of the chamber roof 120. This phenomena is called the Coanda effect. Such an uneven distribution of the gaseous fuel might cause NOx emissions at areas with a high concentration of the gaseous fuel and unburned fuel at areas with a low concentration of the gaseous fuel.

Figure 2:
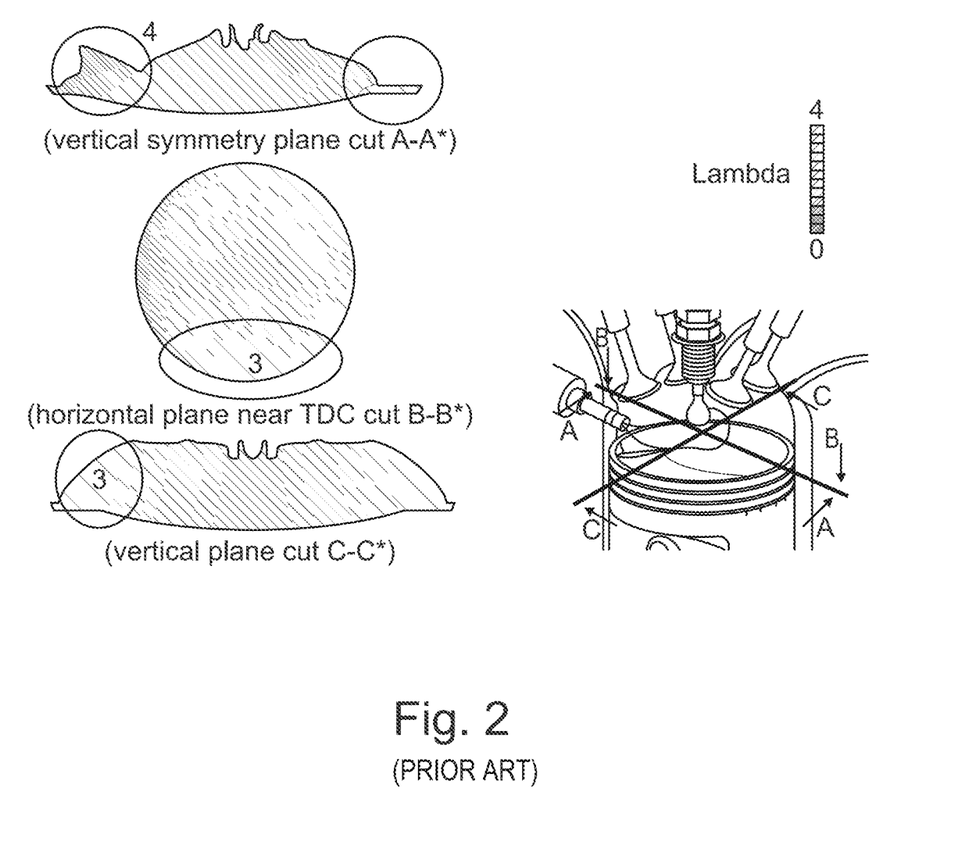
FIG. 2 shows a simulated result of gaseous fuel distribution within a combustion chamber according to the prior art.

FIG. 2 shows a simulated result of fuel distribution within a combustion chamber according to the prior art. In FIG. 2, the index "Lamda" indicates the concentration of the gaseous fuel. For example, the low Lamda indicates a high concentration of gaseous fuel.

In a vertical symmetry plane cut along the line A-A, uneven distribution of the gaseous fuel is shown. The concentration of the gaseous fuel at area 4 where the gaseous fuel is injected is higher than the opposite side of the combustion chamber. It is likely that NOx emission is caused at the area 4 due to too much fuel.

As shown in a horizontal plane cut along the line B-B, the concentration of the gaseous fuel at area 4 is higher than the area 3 which is a side end of the combustion chamber on the horizontal plane. It is likely that unburned fuel is caused at the area 3 due to the lean concentration of fuel.

As shown in a vertical plane cut along the line C-C, the concentration of the gaseous fuel at the area 3 is higher than a middle section of the combustion chamber on this vertical plane.

Figure 3:
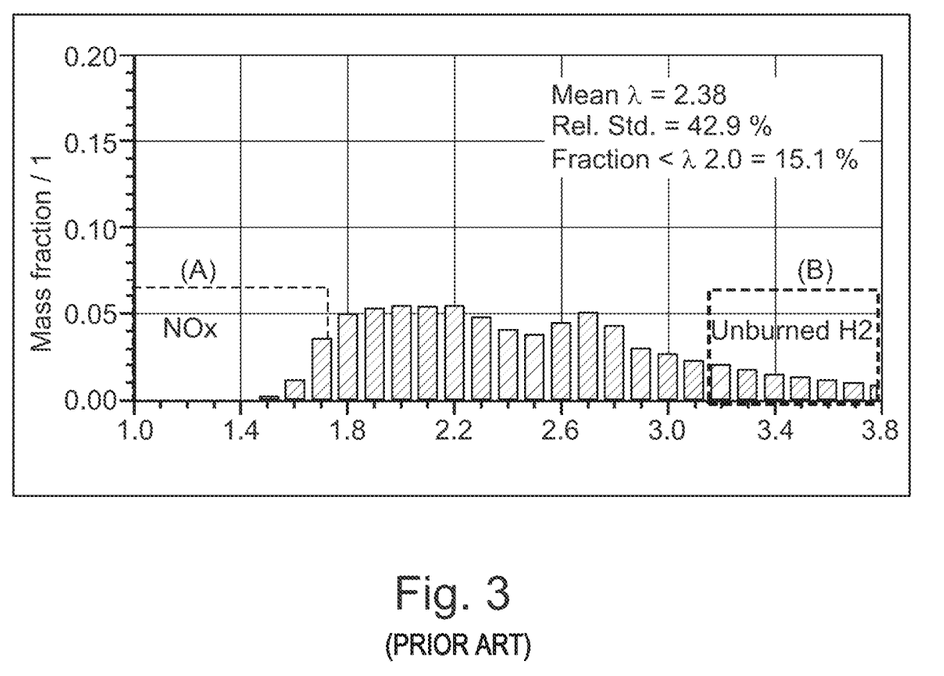
FIG. 3 shows another simulated result of fuel distribution within a combustion chamber according to the prior art.

FIG. 3 shows another simulated result of fuel distribution within a combustion chamber according to the prior art.

In FIG. 3, the area A indicates an amount of NOx emission and the area B indicates an amount of unburned fuel by uneven distribution of the gaseous fuel.

Hereinafter, a combustion chamber for an internal combustion engine according to embodiments of the present invention is provided. It is construed that the internal engine may include the combustion chamber according to an embodiment of the present invention together with other components that enable operation of the engine, such as a piston, an injector, inlet/outlet valves, etc.

Figure 4:
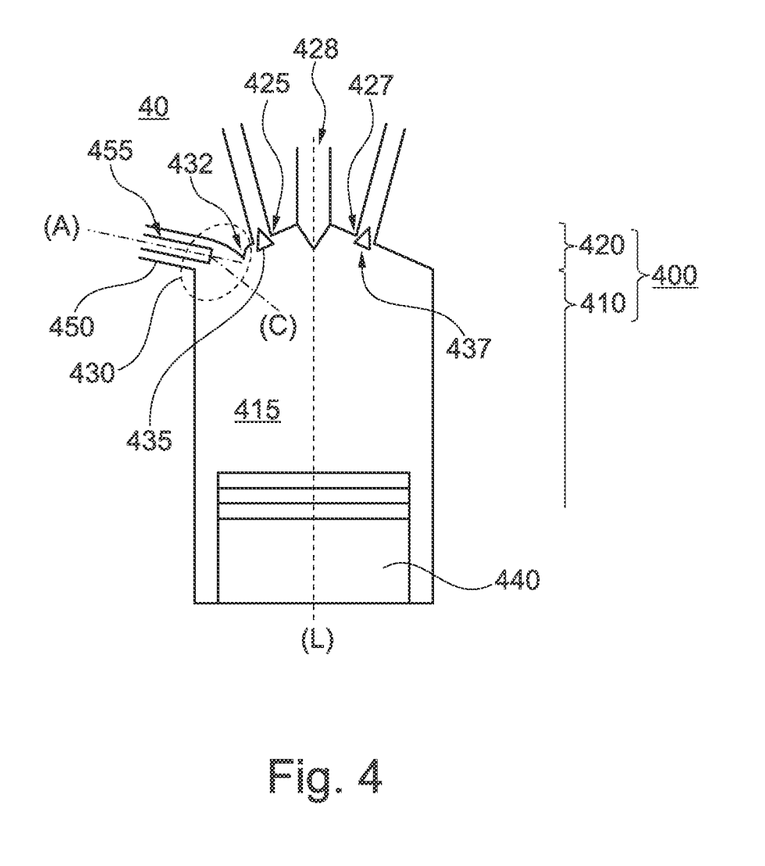
FIG. 4 is an example of a schematic diagram of a combustion chamber for an internal combustion engine according to an embodiment of the present invention.

FIG. 4 is an example of a schematic diagram of a combustion chamber for an internal combustion engine according to an embodiment of the present invention. The combustion engine described herein may be a hydrogen engine and the gaseous fuel may be hydrogen. However, the structure introduced herein may be applied to any type of combustion engine using a gaseous fuel. The engine may include a plurality of combustion chambers.

As shown in FIG. 4, the combustion chamber 400 for an internal combustion engine 40 includes a chamber body 410 and chamber roof 420.

The chamber body 410 may include a cylinder 415. The cylinder 415 may be configured to receive fuel and air for carrying out an engine cycle including a combustion reaction of the fuel. The cylinder 415 may have a longitudinal axis (L) along which a piston 440 moves. In response to the combustion reaction, the piston moves down along the longitudinal axis (L) of the cylinder 415.

The chamber roof 420 may be configured to accommodate a spark plug 428 intersecting an inner surface of the chamber roof 420. The spark plug 428 may be mounted in a drilling above the chamber roof 420 and configured to periodically ignite the fuel mixture including the fuel and the air filled in the cylinder 415. According to an embodiment, chamber roof 420 may have a dome-shape. The spark plug 428 may be positioned on the top of the dome-shaped chamber roof 420.

The chamber roof 420 includes an injector tunnel opening 430 disposed on an inner surface of the chamber roof 420. The injector tunnel opening 430 may encompass a concave area from the inner surface of the chamber roof 420 to the injector tunnel 450 disposed inside the chamber roof 420. The injector tunnel 450 may be configured so as to accommodate an injector 455. The injector tunnel opening 430 may be configured to guide the fuel injected in an injecting direction (A) toward the cylinder 415. Thus, the initial injecting direction of the fuel can be referred to as the injecting direction (A).

According to an embodiment, the injector tunnel opening 430 may be disposed between the chamber body 410 and the chamber roof 420. A protrusion 432 of the injector tunnel opening 430 may have a sharp tear-off edge. The protrusion 432 is disposed on one side of the injector tunnel opening 430 that is distant from the chamber body 410. Thus, it is possible that the protrusion 432 pushes the gaseous fuel towards the chamber body 410 out of the injecting direction.

The injector tunnel opening 430 may include the protrusion 432 disposed on a path of the fuel along the injecting direction (A). Thus, the fuel injected along the injecting direction (A) may encounter the protrusion 432 and be forced to flow in a different direction.

The protrusion 432 followed by the tear-off edge may be configured to re-direct the path of the fuel away from the inner surface of the chamber roof 420. According to an embodiment, the re-directed path (C) of the fuel caused by the protrusion 432 includes a curved path along a surface of the injector tunnel opening 430 toward a protruding edged-boundary of the protrusion 432. The protrusion 432 may have the protruding edged-boundary between the injector tunnel opening 430 and the inner surface of the chamber roof 420. The protruding edged-boundary may enable avoidance of the Coanda effect and therefore the gaseous fuel flowing through the surface of the injector tunnel opening 430 is prevented from being drawn and attached to the inner surface of the chamber roof 420 after passing the protruding edged-boundary. Thus, the penetration length of the gaseous fuel may be increased and gaseous fuel is not accumulated on the chamber roof 420.

According to an embodiment, a center of the protrusion 432 may protrude toward a center or a bottom of the cylinder 415 more than the two sides of the protrusion 432. With help of the protrusion 432, a fraction of the gaseous fuel may flow along the curved path along the surface of the injector tunnel opening 430 toward the center or the bottom of the cylinder 415 and the other may be separated to both sides of the protrusion 432. Thus, the gaseous fuel can be sufficiently distributed within the cylinder 415.

The chamber roof 420 may include at least one inlet port 425 configured to feed the cylinder 415 with the air and at least one outlet port 427 configured to remove from the cylinder exhaust gas formed after the combustion reaction. The at least one inlet port 425 may be configured such that the inlet port 425 can comprise a respective inlet valve 435.

The at least one outlet port 427 may be configured such that the outlet port 427 can comprise a respective outlet valve 437.

The injector tunnel opening 430 may further include a pair of grooves arranged on both sides of the protrusion 432 to guide the fuel separated by the protrusion 432 to both sides of the protrusion 432. According to an embodiment, the protruding edged-boundary may extend from a center of the protrusion 432 toward both sides of the protrusion 432 and connect with the pair of grooves.

The pair of grooves further improves the fuel distribution in side directions, and therefore homogeneous gaseous fuel (hydrogen) is distributed more evenly throughout the complete combustion chamber 400.

The detailed structures of the protrusion 432 and the pair of grooves are described below.

Figure 5:
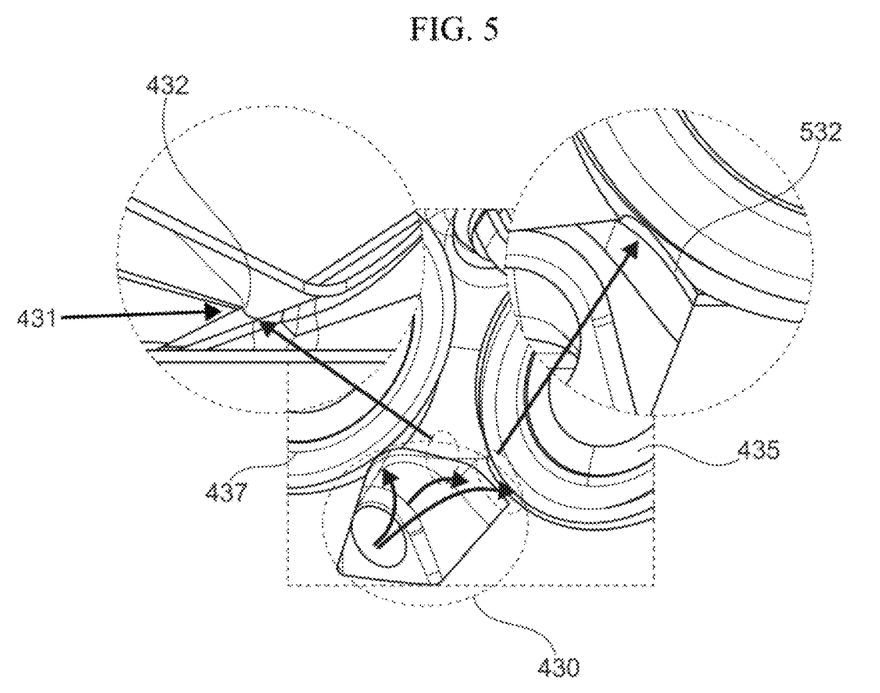
FIG. 5 is an example of a schematic diagram of a combustion chamber for an internal combustion engine according to an embodiment of the present invention.

FIG. 5 is an example of a schematic diagram of combustion chamber for an internal combustion engine according to an embodiment of the present invention. FIG. 5 is a detailed diagram of the combustion chamber shown in FIG. 4.

As shown in FIG. 5, the injector tunnel opening 430 may include the protrusion 432, the protruding edged-boundary 431, and a pair of grooves 532.

The protrusion 432 may be configured to push the gaseous fuel away from the injecting direction toward the bottom of the cylinder 415. For that, the protrusion 432 may be disposed on one side of the injector tunnel opening 430 that is distant from the chamber body 410. This structure can increase the spray penetration length of the gaseous fuel.

The pair of grooves 532 may be configured to allow the gaseous fuel to pass the protrusion 432 on both sides of the protrusion 432. This structure enables prevention of lean areas at the sides and it may avoid unburned gaseous fuel at both sides of the protrusion 432. The area 3 shown in FIG. 2 within the combustion chamber can be sufficiently filled with the gaseous fuel as well.

According to an embodiment, the protruding edged-boundary may extend from a center of the protrusion 432 toward both sides of the protrusion 432 and may connect with the pair of grooves 532.

Each of the pair of grooves 532 may be configured to connect the injector tunnel opening 430 with one of the at least one inlet port 425.

Figure 6:
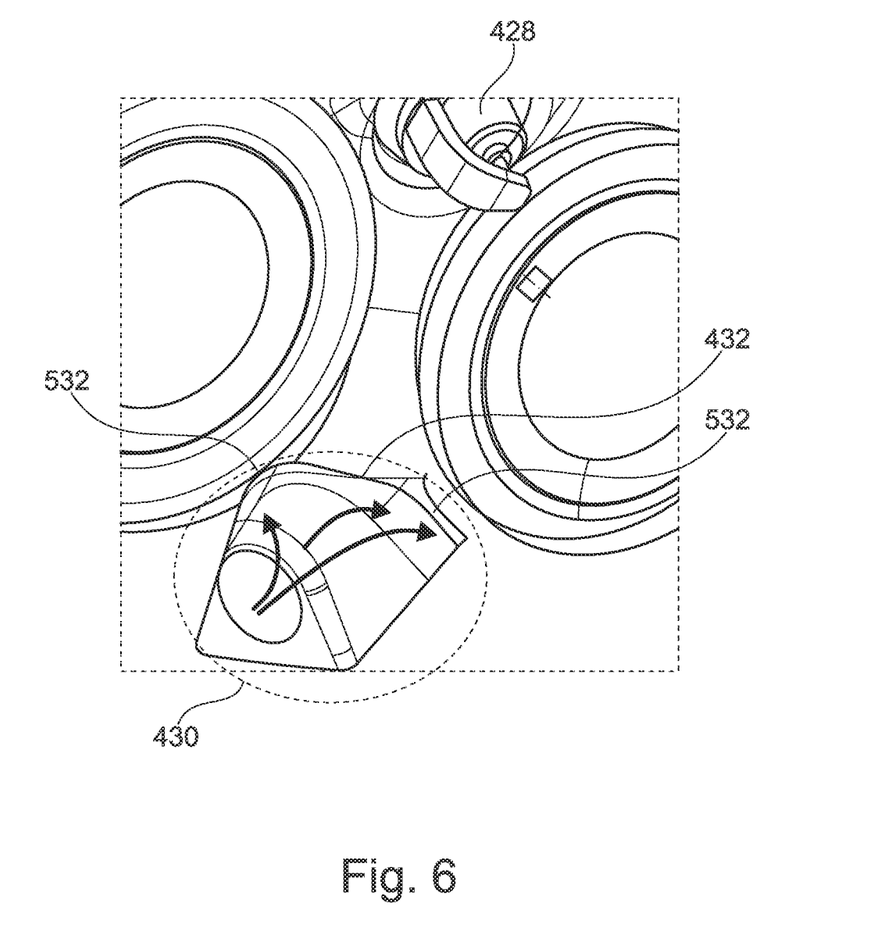
FIG. 6 is an example of a schematic diagram of a combustion chamber for an internal combustion engine according to an embodiment of the present invention seen from a different angle indicating the intended flow direction of injected gaseous fuel.

FIG. 6 is an example of a schematic diagram of a combustion chamber for an internal combustion engine according to an embodiment of the present invention seen from a different angle indicating the intended flow direction of the injected gaseous fuel.

As shown in FIG. 6, the gaseous fuel injected into the combustion chamber 400 may be separated into 3 different directions. That is, a fraction of the gaseous fuel may be re-directed toward the cylinder 415, thus being prevented from flowing along the inner surface of the chamber roof 420, and the rest of the gaseous fuel is separated toward both sides of the protrusion 432.

According to embodiments of the present invention, mixture formation of gaseous fuel is improved by sufficiently distributing the gaseous fuel throughout the combustion chamber 400.

Figure 7:
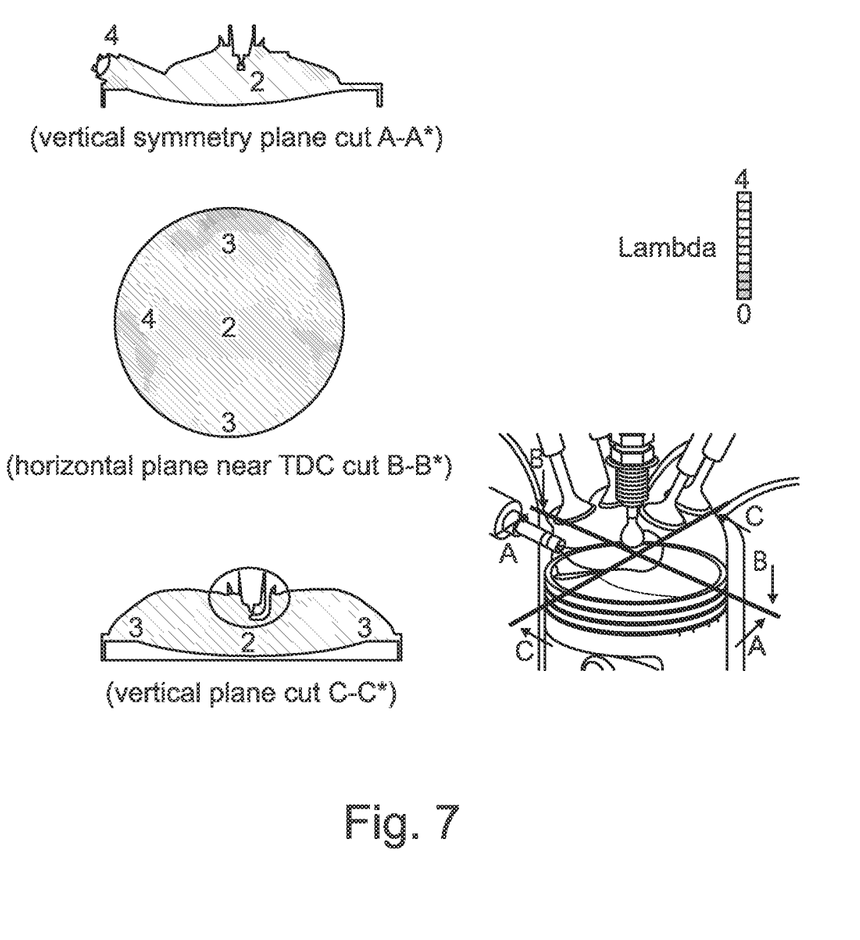
FIG. 7 shows a simulated result of fuel distribution within a combustion chamber according to an embodiment of the present invention.

FIG. 7 shows a simulated result of fuel distribution within a combustion chamber according to an embodiment of the present invention.

In a vertical symmetry plane cut along the line A-A, improved distribution of the gaseous fuel is shown. The concentration of the gaseous fuel at area 4 where the gaseous fuel is injected is similar to the opposite side (area 2) of the combustion chamber. In view of the penetration of the gaseous fuel to area 2, the ignition of the fuel mixture can be significantly improved.

As shown in a horizontal plane cut along the line B-B, the concentration of the gaseous fuel at area 3 is significantly enhanced, compared to the corresponding horizontal plane of FIG. 2.

As shown in a vertical plane cut along the line C-C, the concentration of the gaseous fuel at the areas 2 and 3 is also improved.

Compared to the simulated result shown in FIG. 2, in FIG. 7, the gaseous fuel is sufficiently distributed throughout the whole combustion chamber.

Figure 8:
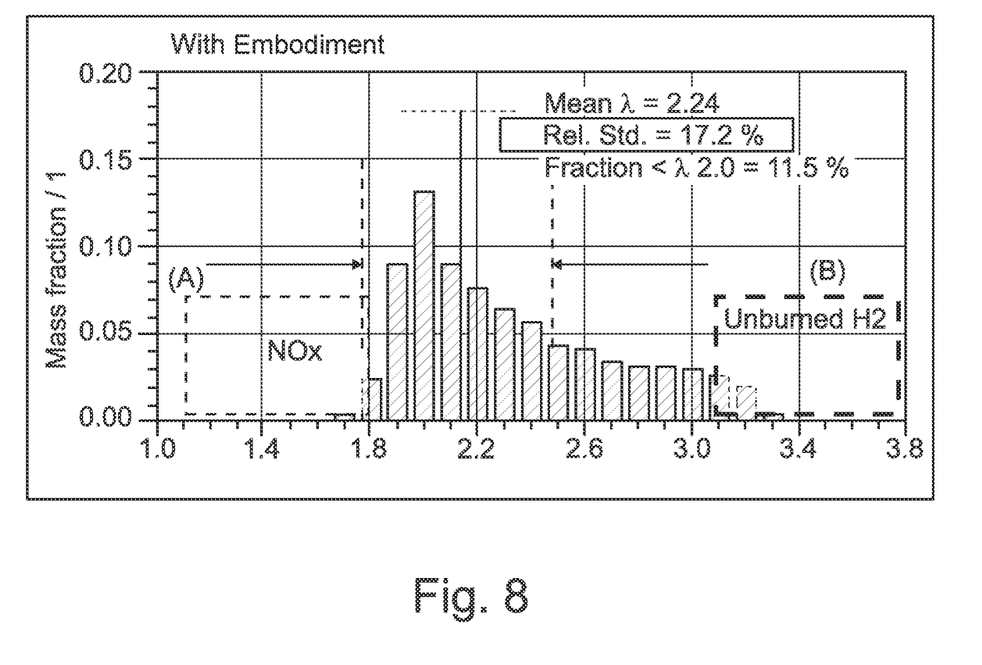
FIG. 8 shows another simulated result of fuel distribution within a combustion chamber according to an embodiment of the present invention.

FIG. 8 shows another simulated result of fuel distribution within a combustion chamber according to an embodiment of the present invention.

In FIG. 8, the area A indicates an area where NOx emission takes place and the area B indicates an area where unburned fuel remains that is caused by uneven distribution of the gaseous fuel.

Compared to FIG. 3, in FIG. 8, the amount of the middle part of the graph is increased and the amount of both sides (areas A and B) is successfully suppressed.

Figure 9A:
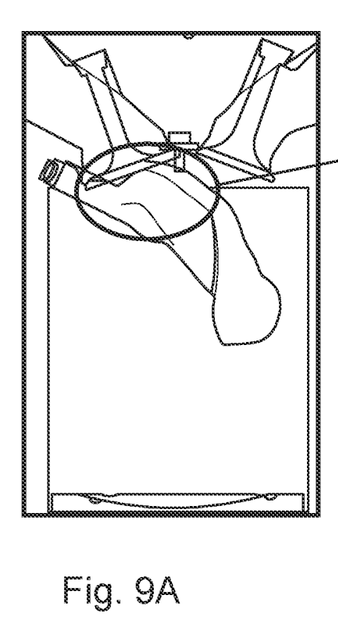
FIGS. 9A and 9B show a simulated result of fuel distribution within a combustion chamber according to an embodiment of the present invention using a 3D CFD simulation.
Figure 9B:
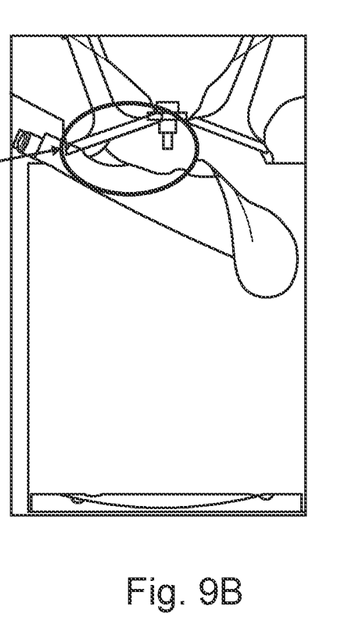

FIGS. 9A and 9B show a simulated result of fuel distribution within a combustion chamber according to an embodiment of the present invention using a 3D CFD simulation.

The simulation result of the gaseous distribution according to the prior art is shown in FIG. 9A, and the simulation result of the gaseous distribution according to an embodiment of the present invention is shown in FIG. 9B.

In FIG. 9A, the Coanda effect with gaseous fuel on the roof surface of the combustion chamber is observed. In FIG. 9B, the separation of gaseous fuel from the roof surface is recognized and cloud penetration in the combustion chamber is improved.

Figure 10A:
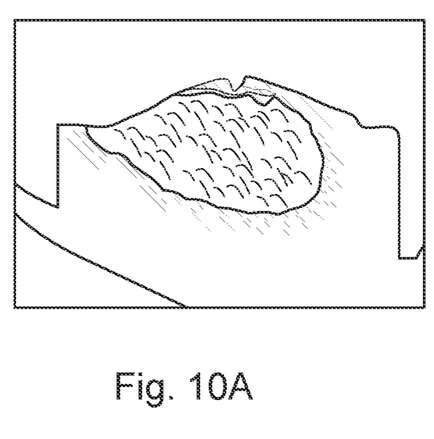
FIGS. 10A and 10B show a measured result of fuel distribution within a combustion chamber according to an embodiment of the present invention using an optical spray chamber measurement.
Figure 10B:
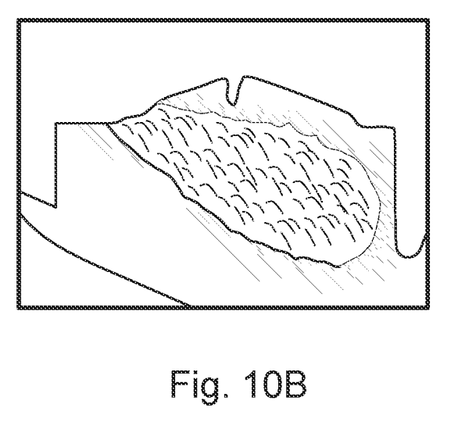

FIGS. 10A and 10B show a measured result of fuel distribution within a combustion chamber according to an embodiment of the present invention using an optical spray chamber measurement (Schlieren).

The measured result of the gaseous distribution according to the prior art is shown in FIG. 10A, and the measured result of the gaseous distribution according to an embodiment of the present invention is shown in FIG. 10B.

Results of Schlieren measurements of FIGS. 10A and 10B confirm the simulation results of FIGS. 9A and 9B and the positive effect of advanced geometry with the injector tunnel opening including a protrusion and a pair of grooves.

In FIG. 10A, the Coanda effect with the gaseous fuel (visualized by the Schlieren optical method in a spray chamber during h2 cloud movement) particularly being drawn to the combustion chamber roof surface and reaching a lowered penetration are observed.

In FIG. 10B, the detachment of the gaseous fuel from the inner surface of the combustion chamber roof and increased gaseous fuel penetration are confirmed.

Although embodiments of the present invention have been described in the above by way of preferred embodiments, they are not limited thereto, but rather can be modified in a wide range of ways. In particular, embodiments of the invention can be changed or modified in various ways without deviating from the core of the embodiments of the invention.

REFERENCE LIST

10 internal combustion engine
100 combustion chamber
110 chamber body
115 cylinder
120 chamber roof
122 inlet port
124 outlet port
128 spark plug
130 injector tunnel opening
132 inlet valve
134 outlet valve
140 piston
150 injector tunnel
155 injector
40 internal combustion engine
400 combustion chamber
410 chamber body
415 cylinder
420 chamber roof
425 inlet port
427 outlet port
428 spark plug
430 injector tunnel opening
432 protrusion
435 inlet valve
437 outlet valve
440 piston
450 injector tunnel
455 injector
532 grooves

What is claimed is:

1. A combustion chamber for an internal combustion engine, the combustion chamber comprising:
    a chamber body comprising a cylinder configured to receive fuel and air for carrying out an engine cycle including a combustion reaction of the fuel; and
    a chamber roof comprising an injector tunnel opening disposed on an inner surface of the chamber roof between the chamber body and a peak of the chamber roof, the injector tunnel opening being configured to guide the fuel injected in an injecting direction toward the cylinder, and the injector tunnel opening comprising:
        a protrusion disposed on a path of the fuel along the injecting direction, the protrusion being configured to re-direct the path of the fuel along a re-directed path away from the inner surface of the chamber roof; and
        a pair of grooves arranged on sides of the protrusion, respectively, the pair of grooves being configured to guide the fuel separated by the protrusion to the sides of the protrusion.

2. The combustion chamber according to claim 1, wherein the protrusion comprises a protruding edged-boundary between the injector tunnel opening and the inner surface of the chamber roof.

3. The combustion chamber according to claim 2, wherein the protruding edged-boundary extends from a center of the protrusion toward the sides of the protrusion and connects with the pair of grooves.

4. The combustion chamber according to claim 3, wherein the center of the protrusion protrudes towards a center or a bottom of the cylinder more than the sides of the protrusion protrude towards the center or the bottom of the cylinder.

5. The combustion chamber according claim 3, wherein the re-directed path of the fuel comprises a curved path along a surface of the injector tunnel opening towards the protruding edged-boundary of the protrusion.

6. The combustion chamber according to claim 3, wherein the protrusion is disposed on a side of the injector tunnel opening that is most distant from the chamber body.

7. The combustion chamber according to claim 3, wherein the chamber roof further comprises:
- an inlet port configured to feed the cylinder with the air, wherein the pair of grooves connects the injector tunnel opening with the inlet port; and
- an outlet port configured to remove exhaust gas resulting from the combustion reaction from the cylinder.

8. The combustion chamber according to claim 3, wherein the chamber roof has a dome shape.

9. The combustion chamber according to claim 1, wherein a center of the protrusion protrudes towards a center or a bottom of the cylinder more than the sides of the protrusion protrude towards the center or the bottom of the cylinder.

10. The combustion chamber according to claim 1, wherein the re-directed path of the fuel comprises a curved path along a surface of the injector tunnel opening toward a protruding edged-boundary of the protrusion.

11. The combustion chamber according to claim 1, wherein the protrusion is disposed on a side of the injector tunnel opening that is most distant from the chamber body.

12. The combustion chamber according claim 1, wherein the chamber roof further comprises:
- an inlet port configured to feed the cylinder with the air, wherein the pair of grooves connects the injector tunnel opening with the inlet port; and
- an outlet port configured to remove exhaust gas resulting from the combustion reaction from the cylinder.

13. The combustion chamber according to claim 1, wherein the chamber roof has a dome shape.

14. An internal combustion engine comprising:
a combustion chamber comprising:
- a chamber body comprising a cylinder configured to receive fuel and air for carrying out an engine cycle including a combustion reaction of the fuel; and
- a chamber roof comprising an injector tunnel opening disposed on an inner surface of the chamber roof, the injector tunnel opening being configured to guide the fuel injected in an injecting direction toward the cylinder, and the injector tunnel opening comprising:
  - a protrusion disposed on a path of the fuel along the injecting direction, the protrusion being configured to re-direct the path of the fuel along a re-directed path away from the inner surface of the chamber roof, wherein the injector tunnel opening is disposed between the chamber body and a peak of the chamber roof; and
  - a pair of grooves arranged on sides of the protrusion, respectively, the pair of grooves being configured to guide the fuel separated by the protrusion to the sides of the protrusion;
- an inlet valve positioned on an inlet port of the combustion chamber, the inlet port being configured to feed the cylinder with the air and the inlet valve being configured to control the air flowing into the cylinder;
- an outlet valve positioned on an outlet port of the combustion chamber, the outlet port being configured to remove exhaust gas resulting from the combustion reaction and the outlet valve being configured to control the exhaust gas flowing out from the cylinder;
- a spark plug mounted on the chamber roof and configured to periodically ignite a mixture of the fuel and the air filled in the cylinder;
- a piston mounted in a sliding manner along a longitudinal axis of the cylinder, wherein the piston is configured to travel along the longitudinal axis according to the combustion reaction; and
- an injector configured to inject the fuel in the injecting direction into the cylinder.

15. The internal combustion engine according to claim 14, wherein:
- the protrusion comprises a protruding edged-boundary between the injector tunnel opening and the inner surface of the chamber roof;
- the protruding edged-boundary extends from a center of the protrusion toward the sides of the protrusion and connects with the pair of grooves; and
- the center of the protrusion protrudes towards a center or a bottom of the cylinder more than the sides of the protrusion protrude towards the center or the bottom of the cylinder.

16. The internal combustion engine according claim 14, wherein the re-directed path of the fuel comprises a curved path along a surface of the injector tunnel opening towards a protruding edged-boundary of the protrusion.

17. The internal combustion engine according to claim 14, wherein the protrusion is disposed on a side of the injector tunnel opening that is most distant from the chamber body.

18. The internal combustion engine according to claim 14, wherein the chamber roof has a dome shape.

* * * * *

UNITED STATES PATENT AND TRADEMARK OFFICE
CERTIFICATE OF CORRECTION

| | |
|---|---|
| PATENT NO. | : 12,116,952 B1 |
| APPLICATION NO. | : 18/506469 |
| DATED | : October 15, 2024 |
| INVENTOR(S) | : Tichy et al. |

It is certified that error appears in the above-identified patent and that said Letters Patent is hereby corrected as shown below:

In the Claims

In Column 8, in Claim 5, Line 64, delete "according" and insert -- according to --.

In Column 9, in Claim 12, Line 24, delete "according" and insert -- according to --.

In Column 10, in Claim 16, Line 38, delete "according" and insert -- according to --.

Signed and Sealed this
Twenty-sixth Day of November, 2024

Katherine Kelly Vidal

Katherine Kelly Vidal
*Director of the United States Patent and Trademark Office*